Oct. 27, 1931. G. VON BEULWITZ 1,829,249
GEAR PROTECTION
Filed Jan. 30, 1931
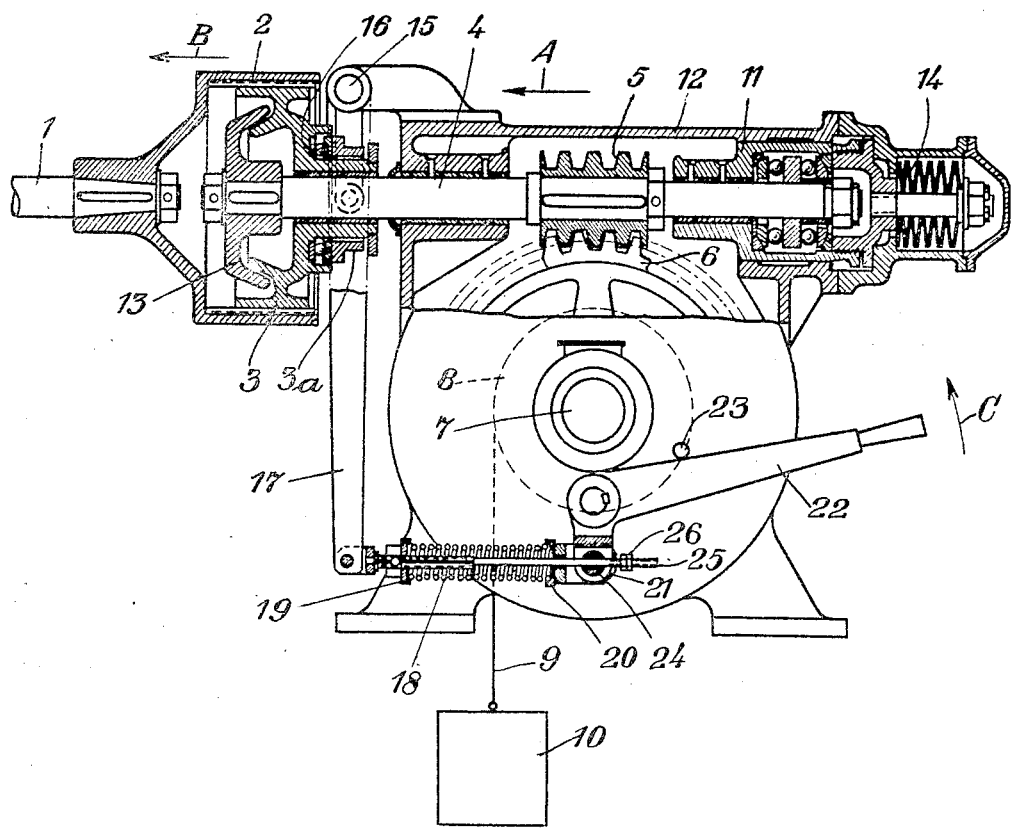
Inventor:
G. Von Beulwitz
By Marks & Clerk
Attys.

Patented Oct. 27, 1931

1,829,249

UNITED STATES PATENT OFFICE

GUSTAV VON BEULWITZ, OF BREMEN, GERMANY, ASSIGNOR TO THE FIRM ATLAS-WERKE AKTIENGESELLSCHAFT, OF BREMEN, GERMANY

GEAR PROTECTION

Application filed January 30, 1931, Serial No. 512,412, and in Germany February 3, 1930.

In worm gears, owing to shocks, excessive torques, moments of inertia of revolving masses, and so forth, stresses arise in the gear, which stress the same to an inadmissible extent and lead to expensive disturbances in working. Ordinary friction clutches do not in general afford protection against this.

On this ground it has already been proposed, in worm gears, to mount the worm shaft, which is connected with one member of the friction clutch, slidably in the longitudinal direction, and to press the member connected with the worm shaft against the other member of the friction clutch by spring action. In this manner, in the event of excessive tooth pressure between the worm, wheel and the worm, a disconnection of the driving shaft takes place by releasing the friction clutch before any injury to the gear can occur.

Such an arrangement however exhibits the following serious disadvantage:—

Such gears are frequently interposed between a driving member and a driven member, in which either the driving power of the driving member or the load on the driven member, or driving power and load are subjected to more or less extensive variations in the ordinary operation of the gear, or else slight shocks occur in these members.

In the case of such variations or slight shocks, with the arrangement described, the driven member is always released from the driving member by accidental opening of the friction clutch, which brings about disturbances when such a gear is employed.

According to this invention a resilient element is provided which acts upon the clutch device and prevents the driving engine from being uncoupled in the case of slight shocks or variations in the driving power or in the load. This device moreover is to be operated by means of a hand lever, in order to enable the clutch to be opened at any time, if desired.

The invention is illustrated by way of example in the accompanying drawing, partly in outside elevation, and partly in section.

In this drawing, 1 denotes the driving shaft, 2 a clutch casing, 3 a clutch member connected with the casing 2 in the peripheral direction but slidable in the longitudinal direction thereof, 4 a worm shaft, 5 the worm on this shaft, 6 a worm wheel, 7 the worm wheel shaft, which is the driven shaft. The driven shaft of such a gear may be loaded in any desired manner. In the constructional example illustrated a winding drum 8 is indicated, which is adapted by means of a cable 9 to raise a load, which is diagrammatically indicated at 10. 11 is a bearing member for the worm shaft, and is slidable in the casing 12 of the gear. 13 is a clutch member which is mounted fast upon the worm shaft 4, and which under the action of a spring 14 is kept in contact with the clutch members.

This arrangement has the result that in the case of excessive stressing of the gear, the worm shaft 4 can shift in the direction of the arrow A, so that the clutch member 13 on the worm shaft releases itself from the clutch member 3, which revolves with the driving shaft.

Now in order to prevent an undesirable release in the case of slight variations in the driving power of the driving member or in the loading of the driven member or in the case of slight shocks, according to the invention a resilient element is provided which acts upon the clutch device. In the example of construction illustrated, the clutch member 3, as hereinbefore indicated, is for this purpose so supported as to be displaceable in the longitudinal direction of the worm shaft, for instance by being suspended at a point 15. For this purpose there is arranged between a member 3a and the actual clutch member 3 a ball bearing 16. The member 3a is connected with a lever 17 upon which the resilient element acts. This resilient element consists in the constructional example shown of a helical spring 18, which acts with one end upon the lever 17, through the medium of a spring plate 19 for example, while the other end bears against a stop, which in this case consists of a spring plate 20, a member 21, a hand lever 22, and a catch 23. This hand lever is so designed, by being provided with a suitable ratchet for example, that it is held fast in one or in various positions, for instance in the position shown. The member 21 and the hand lever 22 are connected by a connecting piece, such as a bolt 24, which in this construction fulfils an important function. The lever 17 is connected with the hand lever 22, or more particularly with the bolt 24, by means of a tension rod 25, upon which are arranged adjustable abutment members, such as nuts 26, in such a way that with the ordinary loading of the gear, these abutment members are some distance from the bolt 24. The method of operation of the gear-protecting means is as follows:—

If in consequence of slight shocks for example, or slight variations in the load, the worm shaft is slightly shifted in the direction of the arrow A, owing to the fact that the clutch member 13 moves in the direction of the arrow B and therefore has a tendency to separate from the clutch member 3, the clutch member 3 is likewise shifted in the direction of the arrow B, owing to the helical spring 18, and thus the contact between the two clutch members is maintained, whereby a release of the clutch cannot occur. If, however, the load exceeds the permissible amount, that is to say, the two clutch members 3 and 13 move a rather considerable distance in the direction of the arrow B, the abutment members 26 come into contact with the bolt 24. This has the result that from this point onwards the clutch member 3 in the event of a further displacement of the clutch member 13 can no longer follow the latter, whereby the two clutch members are separated from one another and the clutch is released.

By moving the hand lever 22 in the direction of the arrow C an opening of the clutch is possible at any time.

What I claim is:—

1. Gear protecting means, consisting in combination of a driving shaft, an axially displaceable worm shaft, a clutch casing revolving with the driving shaft, a clutch member revolving with the clutch casing but axially displaceable upon the worm shaft, a bearing member for the worm shaft, slidable in a casing, a clutch member mounted fast upon the end of the worm shaft, a spring tending to keep the last-mentioned clutch member in contact with the first-mentioned clutch member by means of the bearing member and the worm shaft, a worm on the worm shaft, a worm wheel meshing with the worm, connected with a shaft, a resilient device acting upon the clutch member of the driving shaft that is displaceable upon the worm shaft, preventing a release of the clutch members at a slight overload but permitting a release in the event of a heavy load, and permitting a release by hand at any time.

2. Gear protection means, consisting in combination of a driving shaft, an axially displaceable worm shaft, a clutch casing revolving with the driving shaft, a clutch member revolving with the clutch casing but axially displaceable upon the worm shaft, a bearing member for the worm shaft, slidable in a casing, a clutch member mounted fast upon the end of the worm shaft, a spring, the latter having a tendency to pull the last-mentioned clutch member into the first-mentioned clutch member by means of the bearing member and the worm shaft, a worm of the worm shaft, a worm wheel meshing with the worm, the latter being connected through an axle with a winch drum, a rocking lever suspended in a rocking point, connected through a connecting member and a thrust bearing with the clutch member slidable upon the worm shaft, a rockable hand lever mounted on the casing of the gear, a compression spring interposed between the hand lever and the connecting member acting upon the slidable clutch member, a limiting member connecting the hand lever and the said connecting member and permitting only a certain expansion of the compression spring.

3. Gear protection means, consisting in combination of a driving shaft, an axially displaceable worm shaft, a clutch casing revolving with the driving shaft, a clutch member revolving with the clutch casing but axially displaceable upon the worm shaft, a bearing member for the worm shaft, slidable in a casing, a clutch member mounted fast upon the end of the worm shaft, a spring, the latter having a tendency to pull the last-mentioned clutch member into the first-mentioned clutch member by means of the bearing member and the worm shaft, a worm on the worm shaft, a worm wheel meshing with the worm, the latter being connected through an axle with a winch drum, a rocking lever suspended in a rocking point, connected through a connecting member and a thrust bearing with the clutch member slidable upon the worm shaft, a bell-crank hand lever, one arm of this lever being provided with a perforated bolt, a tension rod engaging by one end through the bolt as a limiting member but attached by its other end to the first-named rocking lever, a helical spring interposed between the hand lever and the connecting member acting upon the slidable clutch member, this helical spring permitting a slight rocking of the first-named rocking lever at a slight overload without releasing the clutch members of the friction clutch, nuts on the tension rod as an adjustable stop for the release of the clutch members, the nuts being arranged at some distance from the perforated bolt and permitting the release of the clutch members by hand at any time by means of the hand lever.

In testimony whereof I have signed my name to this specification.

GUSTAV von BEULWITZ.